United States Patent
Niu et al.

(10) Patent No.: US 9,121,975 B2
(45) Date of Patent: Sep. 1, 2015

(54) BACKLIGHT MODULE

(71) Applicant: Wistron Corporation, New Taipei (TW)

(72) Inventors: Ya-Ping Niu, New Taipei (TW);
Chin-Yung Liu, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 14/173,830

(22) Filed: Feb. 6, 2014

(65) Prior Publication Data

US 2015/0085525 A1 Mar. 26, 2015

(30) Foreign Application Priority Data

Sep. 23, 2013 (CN) .......................... 2013 1 0436267

(51) Int. Cl.
  *F21V 7/04* (2006.01)
  *F21V 8/00* (2006.01)
(52) U.S. Cl.
  CPC ............ *G02B 6/0011* (2013.01); *G02B 6/0031* (2013.01)
(58) Field of Classification Search
  CPC .. G02B 6/0013; G02B 6/0015; G02B 6/0016; G02B 6/0018
  USPC .................................................. 362/621, 622
  See application file for complete search history.

(56) References Cited

U.S. PATENT DOCUMENTS

| | | | | |
|---|---|---|---|---|
| 6,976,779 | B2 * | 12/2005 | Ohtsuki et al. ................ | 362/608 |
| 7,637,646 | B2 * | 12/2009 | Byun et al. .................... | 362/608 |
| 2003/0076669 | A1 * | 4/2003 | Itoh et al. ........................ | 362/31 |
| 2004/0114343 | A1 * | 6/2004 | Ho .................................. | 362/31 |
| 2004/0130882 | A1 * | 7/2004 | Hara et al. ...................... | 362/31 |
| 2004/0174694 | A1 | 9/2004 | Huang et al. | |
| 2006/0002152 | A1 | 1/2006 | Lee et al. | |
| 2007/0086208 | A1 | 4/2007 | Lee et al. | |
| 2007/0147074 | A1 * | 6/2007 | Sakai et al. ................... | 362/608 |
| 2007/0217224 | A1 * | 9/2007 | Kao et al. ...................... | 362/615 |
| 2008/0002429 | A1 * | 1/2008 | Noba ............................. | 362/612 |
| 2008/0151142 | A1 * | 6/2008 | Noba ............................. | 349/65 |

FOREIGN PATENT DOCUMENTS

| | | |
|---|---|---|
| TW | M332206 | 5/2008 |
| TW | M355397 | 4/2009 |
| TW | M369472 | 11/2009 |

(Continued)

OTHER PUBLICATIONS

"Office Action of Taiwan Counterpart Application," issued on May 13, 2015, with English translation thereof, p. 1-p. 9.

*Primary Examiner* — Jong-Suk (James) Lee
*Assistant Examiner* — Bryon T Gyllstrom
(74) *Attorney, Agent, or Firm* — Jianq Chyun IP Office

(57) ABSTRACT

A light guide plate and a backlight module are provided. The backlight module includes a light source and the light guide plate. The light source includes a light emitting surface. The light guide plate includes a light incident surface, a first surface, and a second surface, wherein the first surface is opposite to the second surface. The light guide plate is disposed at a side of the light source. The light incident surface of the light guide plate is opposite to the light emitting surface of the light source. The light incident surface is connected to the first surface and the second surface and includes a first curved surface and a second curved surface. The first curved surface is adjacent to the first surface, and the second curved surface is adjacent to the second surface. The first curved surface is a concave surface.

12 Claims, 3 Drawing Sheets

(56) References Cited

FOREIGN PATENT DOCUMENTS

| TW | 201213899 | 4/2012 | | | |
|---|---|---|---|---|---|
| TW | I366719 | 6/2012 | | | |
| TW | M445701 | 1/2013 | | | |
| WO | WO 2007036207 A1 | * | 4/2007 | ............... | G02B 6/00 |
| WO | WO 2010050489 A1 | * | 5/2010 | .......... | G02F 1/13357 |

* cited by examiner

BACKLIGHT MODULE

CROSS-REFERENCE TO RELATED APPLICATION

This application claims the priority benefit of China application serial no. 201310436267.0, filed on Sep. 23, 2013. The entirety of the above-mentioned patent application is hereby incorporated by reference herein and made a part of this specification.

BACKGROUND OF THE INVENTION

1. Field of the Invention

The present invention generally relates to a light guide plate and a backlight module, in particular, to a light guide plate and a backlight module with better light utilization efficiency.

2. Description of Related Art

A conventional backlight module mainly includes a light source and a light guide plate, wherein the light guide plate is disposed at a side of the light source. The light source includes a light emitting surface, and the light guide plate includes a light incident surface. The light incident surface of the light guide plate is opposite to and parallel to the light emitting surface of the light source, so that light emitted from the light source is capable of entering the light guide plate.

However, as the backlight module is miniaturized, the light guide plate becomes thinner. A height of the light source is greater than that of the light guide plate, so that a dimension of the light guide plate cannot perfectly match that of the light source. More specifically, the light incident surface of the light guide plate cannot correspond to the whole light emitting surface of the light source. Therefore, the light emitted from the light emitting surface of the light source only partially enters the light guide plate, such that the light utilization efficiency is low.

SUMMARY OF THE INVENTION

Accordingly, the present invention is directed to a light guide plate and a backlight module. The light incident surface of the light guide plate is designed to two curved surfaces, so that an area of the light incident surface is increased. Hence, the percentage of light entering the light guide plate is increased and the light utilization efficiency is improved effectively.

The present invention provides a light guide plate including a first surface, a second surface, and a light incident surface. The second surface is opposite to the first surface. The light incident surface is connected to the first surface and the second surface and includes a first curved surface and a second curved surface. The first curved surface is adjacent to the first surface, and the second curved surface is adjacent to the second surface. The first curved surface is a concave surface.

According to an embodiment of the disclosure, the second curved surface is a convex surface.

According to an embodiment of the disclosure, the second curved surface is a concave surface.

According to an embodiment of the disclosure, a projection from the first curved surface to the first surface does not overlap a projection from the second curved surface to the first surface.

According to an embodiment of the disclosure, a profile of the first curved surface and a profile of the second curved surface are respectively a portion of a circle, an ellipse, or a parabola.

According to an embodiment of the disclosure, the light guide plate further includes a plurality of microstructures, wherein the microstructures are formed on at least one of the first curved surface and the second curved surface.

According to an embodiment of the disclosure, each microstructure is a pillared sawtooth, and an extension direction of each microstructure is perpendicular to a normal direction of the first surface.

According to an embodiment of the disclosure, at least a portion of the sawteeth of the microstructures has two sides with unequal lengths.

The present invention provides a backlight module including a light source and a light guide plate, wherein the light guide plate is disposed at a side of the light source. The light source includes a light emitting surface. The light guide plate includes a light incident surface, a first surface, and a second surface, wherein the second surface is opposite to the first surface. The light emitting surface of the light source is opposite to the light incident surface of the light guide plate. The light incident surface is connected to the first surface and the second surface and includes a first curved surface and a second curved surface. The first curved surface is adjacent to the first surface, and the second curved surface is adjacent to the second surface. The first curved surface is a concave surface.

According to an embodiment of the disclosure, the second curved surface is a convex surface.

According to an embodiment of the disclosure, the second curved surface is a concave surface.

According to an embodiment of the disclosure, a projection from the first curved surface to the first surface does not overlap a projection from the second curved surface to the first surface.

According to an embodiment of the disclosure, a profile of the first curved surface and a profile of the second curved surface are respectively a portion of a circle, an ellipse, or a parabola.

According to an embodiment of the disclosure, the backlight module further includes a plurality of microstructures, wherein the microstructures are formed on at least one of the first curved surface and the second curved surface.

According to an embodiment of the disclosure, each microstructure is a pillared sawtooth, and an extension direction of each microstructure is perpendicular to a normal direction of the first surface.

According to an embodiment of the disclosure, at least a portion of the sawteeth of the microstructures has two sides with unequal lengths.

According to an embodiment of the disclosure, a distance between the first surface and the second surface is less than a height of the light source.

According to an embodiment of the disclosure, an included angle between a normal line of the light emitting surface of the light source and a normal line of the first surface approximately ranges between 40 degrees and 90 degrees.

According to an embodiment of the disclosure, the backlight module further includes a first reflector, wherein the first reflector is disposed at a side of the first surface and extends to the light source.

According to an embodiment of the disclosure, the backlight module further includes a second reflector, wherein the second reflector is disposed at a side of the second surface and extends to the light source.

In view of the above, the light incident surface of the light guide plate is designed to two curved surfaces. The two curved surfaces are disposed obliquely, that is, that projections from the two curved surfaces to the first surface do not overlap. Thus, an area of the light incident surface of the light guide plate is increased, and the area of the light incident surface of the light guide plate is capable of matching that of the light emitting surface of the light source. Moreover, the light emitting surface of the light source of the backlight module is disposed obliquely corresponding to the light incident surface of the light guide plate, so as to increase the probability of the light emitted from the light source to the light guide plate. Besides, the microstructures disposed on at least one of the curved surfaces is capable of effectively reducing the probability of light scattered on the light incident surface and increasing the percentage of light entering the light guide plate. Furthermore, the two reflectors of the backlight module are disposed respectively on the first surface and the second surface of the light guide plate and extend to the relatively two sides of the light source. Therefore, the light which does not enter the light guide plate directly can be reflected to the light guide plate through the two reflectors, so as to enhance the light utilization efficiency.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
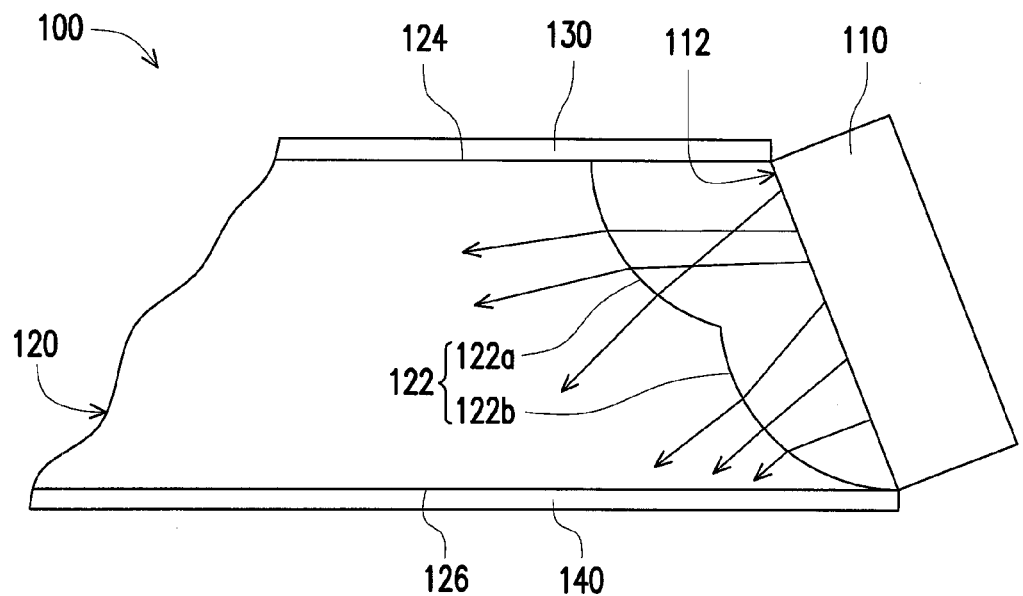
FIG. 1 schematically illustrates a partial side view of a backlight module according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 schematically illustrates a partial side view of a backlight module according to an embodiment of the disclosure. Referring to FIG. 1, a backlight module 100 includes a light source 110, a light guide plate 120, a first reflector 130, and a second reflector 140. In this embodiment, the light source 110 is a light emitting diode (LED), but it is not limited thereto. The light source 110 includes a light emitting surface 112. The light guide plate 120 includes a light incident surface 122, a first surface 124, and a second surface 126, wherein the second surface 126 is opposite to the first surface 124. The light guide plate 120 is disposed at a side of the light source 110, and the light emitting surface 112 of the light source 110 is opposite to the light incident surface 122 of the light guide plate 120. The light incident surface 122 of the light guide plate 120 is connected to the first surface 124 and the second surface 126.

As shown in FIG. 1, in this embodiment, a thickness of the light guide plate 120 (which means a distance between the first surface 124 and the second surface 126) is less than a height of the light source 110. In order to improve the percentage of the light emitted from the light source 110 to the light guide plate 120, in this embodiment, the light incident surface 122 of the light guide plate 120 includes a first curved surface 112a and a second curved surface 112b, wherein the first curved surface 112a is connected to the second curved surface 112b. The first curved surface 112a is adjacent to the first surface 124, and the second curved surface 112b is adjacent to the second surface 126. In this embodiment, the light incident surface 122 of the light guide plate 120 is designed to the first curved surface 112a and the second curved surface 112b so as to increase an area of the light incident surface 122, such that the percentage of light entering the light guide plate 120 is increased.

In this embodiment, both the first curved surface 112a and the second curved surface 112b are concave surfaces, and a profile of the first curved surface 112a and a profile of the second curved surface 112b are respectively a portion of a circle with a same radius. For instance, central angles of curved profiles of the first curved surface 112a and the second curved surface 112b are 90 degrees, respectively. The first curved surface 112a and the second curved surface 112b bisect the light incident surface 122. However, the central angles of the curved profiles of the first curved surface 112a and the second curved surface 122b are not limited thereto.

In another embodiment, a curved profile of the first curved surface 112a and a curved profile of the second curved surface 112b can be arc with the same radius and different central angles. Such as a central angle corresponds to the first curved surface 112a is 60 degrees and a central angle corresponds to the second curved surface 112b is 120 degrees. A percentage of an area of the second curved surface 112b in the light incident surface 122 can be greater than that of an area of the first curved surface 112a in the light incident surface 122.

Alternatively, the first curved surface 112a and the second curved surface 112b can also be a portion of circles with different radius, respectively. In other words, a curvature of the first curved surface 112a is different from that of the second curved surface 112b. Moreover, the first curved surface 112a or the second curved surface 112b can also be a portion of an ellipse, a portion of or the whole of a parabola, but the types of the first curved surface 112a or the second curved surface 112b are not limited thereto.

Besides, in this embodiment, a projection from the first curved surface 112a to the first surface 124 does not overlap a projection from the second curved surface 112b to the first surface 124. That is, the first curved surface 112a is disposed obliquely above the second curved surface 112b instead of being disposed directly above the second curved surface 112b. Based on the above design, a path of the light incident surface 122 of the light guide plate 120 between the first surface 124 and the second surface 126 is longer, wherein the distance of the path is close to a height of the light source 110. Hence, a dimension of the light incident surface 122 of the light guide plate 120 is capable of matching that of the light emitting surface 112 of the light source 110. Certainly, the relative position of the first curved surface 112a and the second curved surface 112b is not limited thereto. In another embodiment, the projection from the first curved surface 112a to the first surface 124 can also overlap the projection from the second curved surface 112b to the first surface 124.

In other words, the first curved surface 112a can be disposed directly above the second curved surface 112b.

In addition, in order to increase the probability of light emitted from the light source 110 to the light guide plate 120, in this embodiment, the light emitting surface 112 of the light source 110 is obliquely disposed at a position corresponding to the light incident surface 122 of the light guide plate 120. An included angle between a normal line of the light emitting surface 112 and a normal line of the first surface 124 approximately ranges between 40 degrees and 90 degrees. Taking the included angle as 60 degrees for example, the light emitting surface 112 of the light source 110 tilts about 30 degrees related to a vertical. The oblique disposition of the light source 110 causes the length of the light incident surface 122 of the light guide plate 120 (i.e. the distance of the path from the first surface 124 to the second surface 126) is close to the height of the light source 110, such that the probability of light emitted from the light source 110 to the light incident surface 122 of the light guide plate 120 can be increased. The light utilization efficiency of the light source 110 is further increased. Certainly, in another embodiment, the light source 110 can also be vertically disposed beside the light incident surface 122 of the light guide plate 120.

Furthermore, in this embodiment, in order to improve the percentage of the light emitted from the light source 110 to the light guide plate 120, the first reflector 130 and the second reflector 140 are disposed respectively at a side of the first surface 124 and a side of the second surface 126, and extend to the two opposite sides of the light source 110. Therefore, the light emitted from the light course 110 may directly enter the light guide plate 120 or be reflected by the first reflector 130 or the second reflector 140 once or several times and then enter the light guide plate 120. Besides, the light refracted twice by the light guide plate 120 (i.e. the light refracted out of the light guide plate 120) also can be reflected by the first reflector 130 or the second reflector 140 to enter the light guide plate 120 again, so as to improve the light utilization efficiency.

In the embodiment, material of the first reflector 130 and the second reflector 140 includes polycarbonate (PC) or polyethylene terephthalate (PET), etc., and the first reflector 130 and the second reflector 140 are coated with a mirror coating so as to provide reflection. However, it is noted that categories of the first reflector 130 and the second reflector 140 are not limited thereto.

In the backlight module 100 of the embodiment, the light incident surface 122 of the light guide plate 120 is designed to the first curved surface 112a and the second curved surface 112b connected to each other, and the first curved surface 112a and the second curved surface 112b are disposed staggeringly related to the first surface 124 so as to enlarge the area of the light incident surface 122. In addition, the light source 110 is obliquely disposed corresponding to the light incident surface 122, so that the light utilization efficiency of the backlight module 100 is increased. According to the simulation result, an average brightness of the backlight module 100 is improved about 5% comparing to that of a conventional backlight module.

Figure 2:
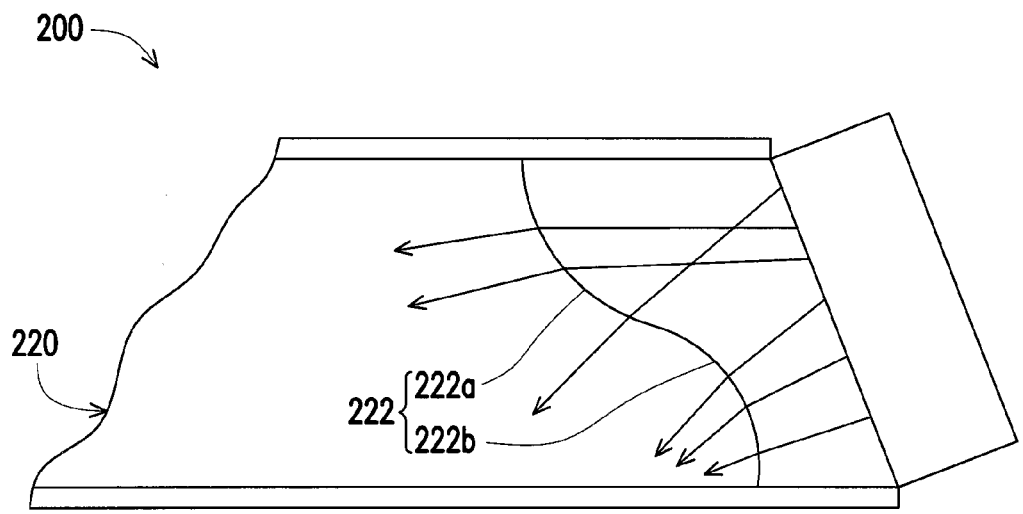
FIG. 2 schematically illustrates a partial side view of a backlight module according to another embodiment of the disclosure.

FIG. 2 schematically illustrates a partial side view of a backlight module according to another embodiment of the disclosure. Referring to FIG. 2, the main difference between a backlight module 200 in FIG. 2 and the backlight module 100 in FIG. 1 is as below. In FIG. 1, both the first curved surface 112a and the second curved surface 112b are concave surface. In this embodiment, a first curved surface 222a is a concave surface, and a second curved surface 222b is a convex surface.

In this embodiment, a light incident surface 222 of the backlight module 200 is designed to the concave first curved surface 222a and the convex second curved surface 222b, such that an area of the light incident surface 222 of a light guide plate 220 is increased so as to effectively increase the percentage of the light entering the light guide plate 220.

It is noted that, although in FIG. 2, the upper part and the lower part of the light incident surface 222 of the light guide plate 220 are respectively concave surface and convex surface, the upper part and the lower part of the light incident surface 222 of the light guide plate 220 also can be respectively convex surface and concave surface.

Figure 3A:
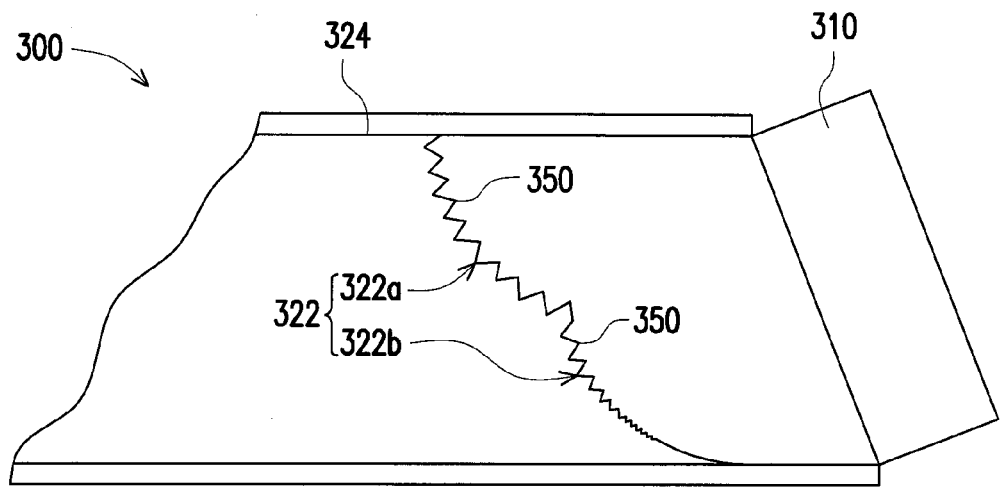
FIG. 3A schematically illustrates a partial side view of a backlight module according to another embodiment of the disclosure.

FIG. 3A schematically illustrates a partial side view of a backlight module according to another embodiment of the disclosure. Referring to FIG. 3A, the main difference between a backlight module 300 in FIG. 3A and the backlight module 100 in FIG. 1 is that the backlight module 300 further includes a plurality of microstructures 350. In the embodiment, the microstructures 350 are formed on a first curved surface 322a and a second curved surface 322b. Nevertheless, in another embodiment, the microstructures 350 can only form on the first curved surface 322a or on the second curved surface 322b. That is, one of the first curved surface 322a and the second curved surface 322b is a rough curved surface with the plurality of microstructures 350, and the other is a smooth curved surface.

Figure 3B:
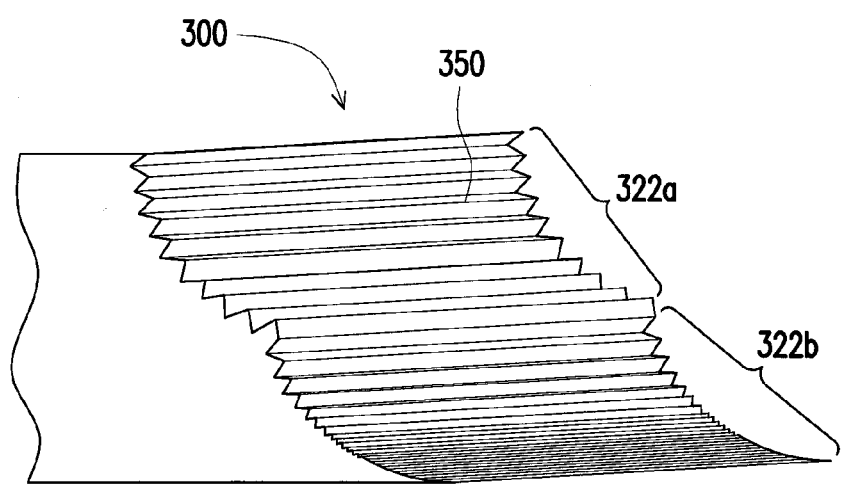
FIG. 3B schematically illustrates a stereoscopic view of the light guide plate of the backlight module of FIG. 3A.

FIG. 3B schematically illustrates a stereoscopic view of the light guide plate of the backlight module of FIG. 3A. Referring to FIG. 3B, in this embodiment, the microstructures 350 are pillared sawteeth, wherein an extension direction of the microstructures 350 is perpendicular to a normal direction of a first surface 324, but a category of the microstructures 350 is not limited to the above. In another embodiment, the microstructures 350 also can be half-cylinder, cone-shaped, irregular island-shaped, hemispheric shaped, cylindrical bump or cavity, etc.

Besides, as shown in FIG. 3A and FIG. 3B, there are several dimensions of the sawteeth of the microstructures 350, and the density of the sawteeth of the microstructures 350 is non-uniform. In this embodiment, the density of the microstructures 350 on the second curved surface 322b which is close to a light source 310 is greater than that of the microstructures 350 on the first curved surface 322a which is away from to the light source 310, but the configuration of the microstructures 350 is not limited thereto. Moreover, in this embodiment, the microstructures 350 are distributed on the whole first curved surface 322a and the whole second curved surface 322b. But in another embodiment, the microstructures 350 can be distributed only on a portion of the first curved surface 322a and a portion of the second curved surface 322b. The distribution of the microstructures 350 is capable of depending on a design of the light path.

Figure 3C:
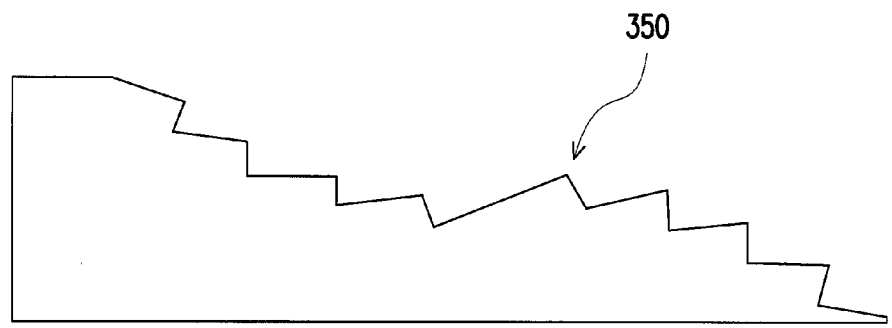
FIG. 3C schematically illustrates a partial side view of the light guide plate of the backlight module of FIG. 3A.

FIG. 3C schematically illustrates a partial side view of the light guide plate of the backlight module of FIG. 3A. Referring to FIG. 3C, in this embodiment, at least a portion of the sawteeth of the microstructures 350 has two sides with unequal lengths. As shown in FIG. 3C, a length of the left side of the sawtooth is greater than that of the right side of the sawtooth. Certainly, in another embodiment, lengths of the two sides of the sawtooth can be equal.

In this embodiment, the microstructures 350 are formed on a light incident surface 322 of a light guide plate 320, so that the probability of light scattered on the light incident surface 322 is decreased. As a result, more light can enter the light incident surface 322 of the light guide plate 320. According to the simulation result, an average brightness of the backlight module 300 can be improved about 3% comparing with that of the backlight module 100 in FIG. 1.

Figure 4:
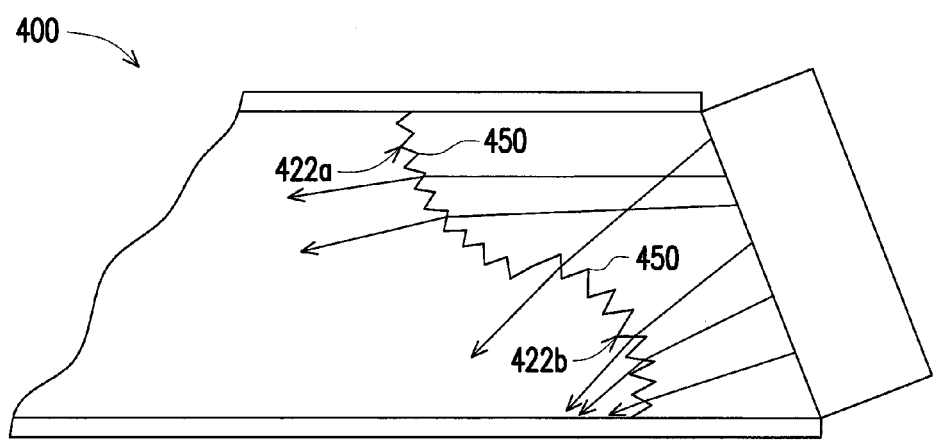
FIG. 4 schematically illustrates a partial side view of a backlight module according to another embodiment of the disclosure.

FIG. 4 schematically illustrates a partial side view of a backlight module according to another embodiment of the disclosure. Referring to FIG. 4, the main difference between a backlight module 400 in FIG. 4 and the backlight module 300 in FIG. 3A is that a second curved surface 422b is a convex surface.

In this embodiment, a plurality of microstructures 450 are formed on a concave first curved surface 422a and a convex second curved surface 422b, so that more light can enter a light guide plate 420. However, in another embodiment, the microstructures 450 can only form on the first curved surface 422a. In other words, the concave first curved surface 422a is rough, and the convex second curved surface 422b is smooth. Certainly, the distribution of the microstructures 450 formed on a light incident surface 422 of the light guide plate 420 is not limited thereto.

Based on the above, the light incident surface of the light guide plate is designed to two curved surfaces. The two curved surfaces are disposed obliquely, that is, that projections from the two curved surfaces to the first surface do not overlap. Thus, an area of the light incident surface of the light guide plate is increased, and the area of the light incident surface of the light guide plate is capable of matching that of the light emitting surface of the light source. Moreover, the light emitting surface of the light source of the backlight module is disposed obliquely corresponding to the light incident surface of the light guide plate, so as to increase the probability of the light emitted from the light source to the light guide plate. Besides, the microstructures disposed on at least one of the curved surfaces is capable of effectively reducing the probability of light scattered on the light incident surface and increasing the percentage of light entering the light guide plate. Furthermore, the two reflectors of the backlight module are disposed respectively on the first surface and the second surface of the light guide plate and extend to the relatively two sides of the light source. Therefore, the light which does not enter the light guide plate directly can be reflected to the light guide plate through the two reflectors, so as to enhance the light utilization efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a light source, comprising a light emitting surface; and
   a light guide plate, disposed at a side of the light source and comprising a light incident surface, a first surface, and a second surface, wherein the second surface is opposite to the first surface, and the light incident surface is connected to the first surface and the second surface and includes a first curved surface and a second curved surface, wherein the first curved surface is adjacent to the first surface, the second curved surface is adjacent to the second surface, the first curved surface is a concave surface, the first curved surface is disposed obliquely above the second curved surface, a thickness throughout the entire light guide plate is substantially uniform, the light emitting surface of the light source is opposite to both of the first curved surface and the second curved surface of the light incident surface of the light guide plate, a height of the light source is larger than a distance between the first surface and the second surface, and the light emitting surface of the light source is obliquely disposed at a position corresponding to the light incident surface of the light guide plate.

2. The backlight module according to claim 1, wherein the second curved surface is a concave surface.

3. The backlight module according to claim 1, wherein the second curved surface is a convex surface.

4. The backlight module according to claim 1, wherein a projection from the first curved surface to the first surface does not overlap a projection from the second curved surface to the first surface.

5. The backlight module according to claim 1, wherein a profile of the first curved surface and a profile of the second curved surface are respectively a portion of a circle, an ellipse, or a parabola.

6. The backlight module according to claim 1, further comprising a plurality of microstructures, formed on at least one of the first curved surface and the second curved surface.

7. The backlight module according to claim 6, wherein each microstructure is a pillared sawtooth, and an extension direction of each microstructure is perpendicular to a normal direction of the first surface.

8. The backlight module according to claim 7, wherein at least a portion of the sawteeth of the microstructures has two sides with unequal lengths.

9. The backlight module according to claim 1, wherein a distance between the first surface and the second surface is less than a height of the light source.

10. The backlight module according to claim 1, wherein an included angle between a normal line of the light emitting surface of the light source and a normal line of the first surface approximately ranges between 40 degrees and 90 degrees.

11. The backlight module according to claim 1, further comprising a first reflector, disposed at a side of the first surface and extending to the light source.

12. The backlight module according to claim 1, further comprising a second reflector, disposed at a side of the second surface and extending to the light source.

* * * * *